Jan. 13, 1931.  W. G. HAGMAIER ET AL  1,788,574
EDGER
Filed May 18, 1928  2 Sheets-Sheet 1

Jan. 13, 1931.  W. G. HAGMAIER ET AL  1,788,574
EDGER
Filed May 18, 1928   2 Sheets-Sheet 2

Inventor
W. G. Hagmaier
E. C. Shaw
by G. J. DeVrin
Attorney

Patented Jan. 13, 1931

1,788,574

UNITED STATES PATENT OFFICE

WILLIAM G. HAGMAIER, OF WEST ALLIS, AND ERNEST C. SHAW, OF MILWAUKEE, WISCONSIN, ASSIGNORS TO ALLIS-CHALMERS MANUFACTURING COMPANY, OF MILWAUKEE, WISCONSIN, A CORPORATION OF DELAWARE

EDGER

Application filed May 18, 1928. Serial No. 278,693.

The present invention relates generally to improvements in saw mill machinery, and relates more specifically to improvements in the construction and operation of saw mill edgers.

An object of the invention is to provide various improvements in the details of construction of saw mill edgers or the like, whereby the operation of such machines is facilitated and by virtue of which the life thereof is prolonged. Another object of the invention is to provide new and useful improvements in edger press roll adjusting and cushioning mechanisms. A further object of the invention is to provide simple, compact and efficient mechanism for effecting adjustment or lateral shifting of the individual saws of an edger. Another object of the invention is to provide improved instrumentalities for facilitating removal of edger saws or the like, from an arbor. Still another object of the invention is to provide an edging machine which is especially adapted to withstand the wear and tear of hard usage resulting from relatively heavy work. These and other objects and advantages will appear from the following description.

A clear conception of embodiments of the various features constituting the present improvement and of the mode of constructing and of operating edgers built in accordance therewith, may be had by referring to the drawings accompanying and forming a part of this specification in which like reference characters designate the same or similar parts in the various views.

Figure 2:
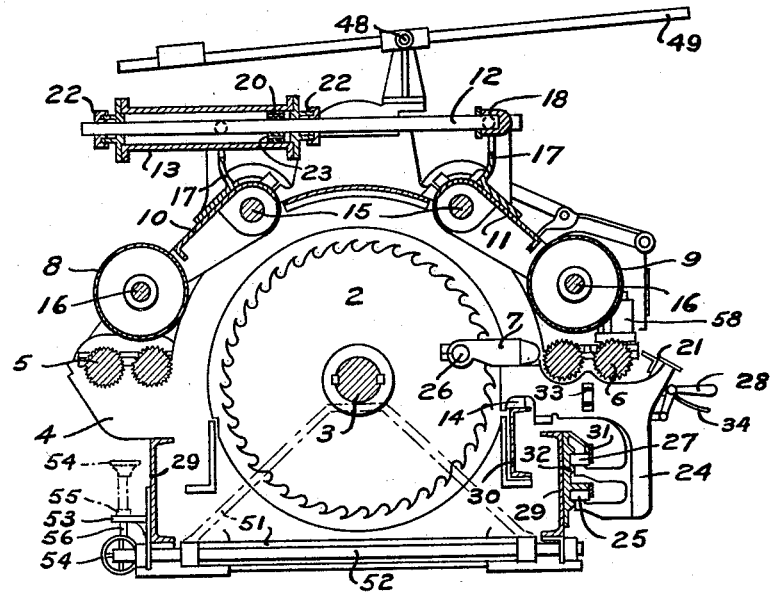
Fig. 2 is a central vertical section through the edger disclosed in Fig. 1.

The improved edger comprises in general a main frame consisting of end frames 4 and channel bars 29, 30 interconnecting the end frames; a rotary saw arbor 3 mounted horizontally in bearings associated with the end frames 4; a plurality of circular saws 2 rotatable by the arbor 3 and adjustable longitudinally therealong; mechanism for independently adjusting the saws 2 along the arbor 3; means for transporting the material being cut toward and away from the saws 2; a pair of press rolls 8, 9 coacting with the material to urge the same against the transporting means; and mechanism for adjusting and for cushioning the press rolls. The arbor 3 and the saws 2 are rotatable in a well known manner by means of transmission mechanism or a motor associated with one end of the arbor, and the saws are rotatable in a clockwise direction as viewed in Fig. 2.

Figure 4:
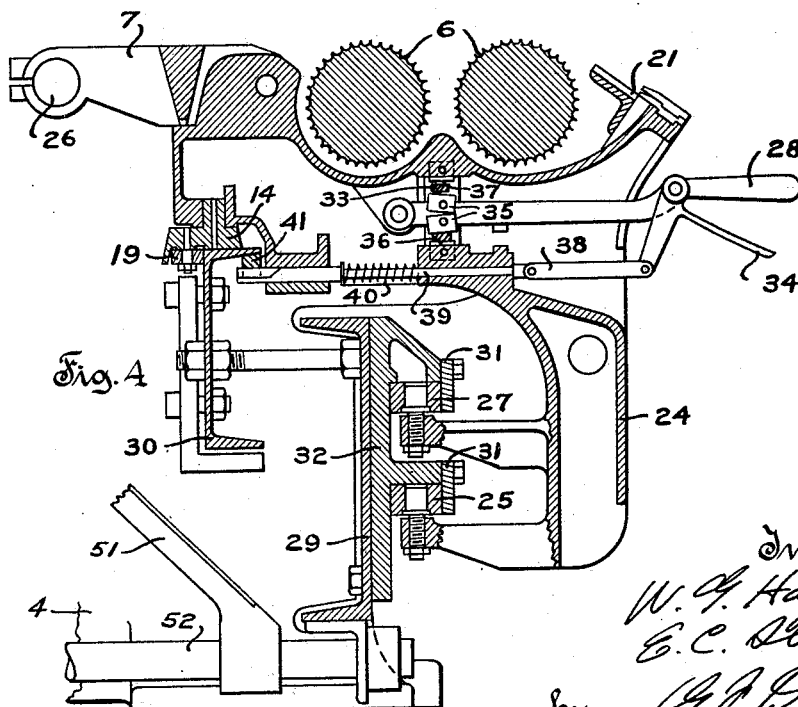
Fig. 4 is an enlarged transverse vertical section through one of the saw shifting mechanisms of the edger.

The improved saw shifting or adjusting mechanism shown in detail in Fig. 4 comprises a series of shifter brackets 24 movable longitudinally of the channel bars 29, 30 and carrying shifter arms 7 having bifurcations straddling the saws 2 and provided with blocks 26 which are engageable with the sides of the saw blades during shifting. Each of the brackets 24 is provided with laterally extending arms the upper of which carries a guide roller 27 cooperating with an upper guide bar 31 secured to a guide bracket 32 associated with the channel bar 29, and the lower of which carries a similar guide roller 25 cooperating with another guide bar 31 associated with the bracket 32, as shown in Fig. 4. The portion of the bracket 24 closely adjacent to the saw, is provided with a shoe 14 which rests upon the upper surface of the channel bar 30. This shoe also carries a roller 19 which coacts with the inner side surface of the channel bar 30 and forms means for preventing outward displacement of the shifter bracket 24. The rollers 19, 25, 27 provide a three point antifriction support for each of the shifter brackets 24. The lower portion of the upper flange of the channel bar 30 is provided with a notched strip 41 with the notches of which a locking bar 39 is engageable in order to positively lock the shifter in adjusted position closely adjacent to the saws. The locking bar 39 is normally urged into locking engagement by means of a spring 40, and may be retracted from engagement with the strip 41 by means of a handle 34 pivotally associated with the shifter handle 28 and operatively connected to the rod 39 by means of a link 38.

The brackets 24 are laterally shiftable along the channel bars 29, 30 by virtue of their cooperation with a constantly traveling power driven chain 33 having upper and lower stretches or runs 37, 36 respectively, extending longitudinally in front of the edger and passing through transverse openings in the brackets 24. It will be apparent that when the chain 33 is driven, the upper run 37 will travel in one direction, and the lower run 36 will simultaneously travel in the opposite direction, so that if a bracket 24 is connected with either of the chain runs, it may be automatically shifted in a desired direction, thereby simultaneously shifting the corresponding saw 2 along the arbor 3. The shifter actuating lever 28 is pivotally associated with the bracket 24 and extends between the chain runs. The lever 28 is provided with clamping grip blocks 35 which upon movement of the lever 28 in a vertical plane are engageable with the adjacent surfaces of the chain runs 36, 37. The bracket 24 is provided with other grip blocks located in vertical alinement with the grip blocks 35 of the lever 28, and cooperable with the outer surfaces of the chain runs 37, 36. The arrangement is obviously such that when the lever 28 is shifted vertically and the locking bar 39 has been retracted, either of the chain runs 36, 37 may be firmly gripped between the adjacent grip blocks of the lever 28 and of the bracket 24, thereby causing the bracket to shift laterally. By virtue of the anti-friction supports afforded by the rollers 19, 25, 27, the brackets 24 may also be readily shifted manually by merely applying horizontal pressure to the levers 28. The degree of shifting may be readily determined by means of a gage 21 disposed at the front of the mechanism.

Figure 3:
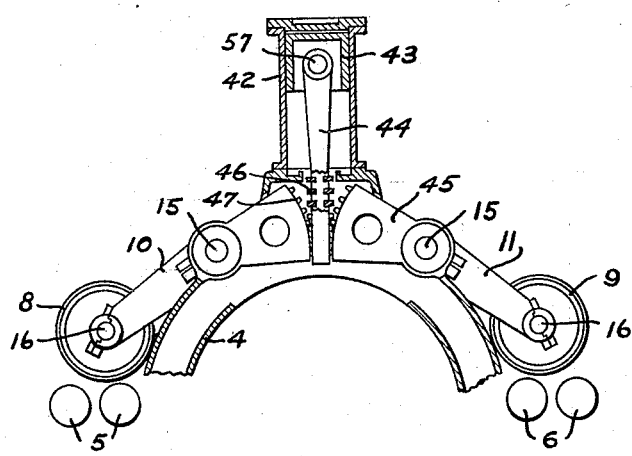
Fig. 3 is a fragmentary sectional view through the press roll actuating mechanism of the edger.

The mechanism for transporting the material toward and away from the saws 2 comprises rear and front feed rolls, 5, 6 respectively, which are being constantly rotated during operation of the machine. Above these feed rolls, the press rolls 8, 9 are adjustably disposed, the press rolls being relatively heavy in structure so as to urge the material in contact with the corrugated feed rolls to thereby insure positive transportation of the material. The press rolls 8, 9 are swingably supported from pivots 15 by means of arms 10, 11 and may be raised away from the feed rolls by means of a fluid actuated piston 43 disposed within an actuating cylinder 42 as shown in detail in Fig. 3. The fluid under pressure may be admitted to the cylinder 42 above the piston 43 through a control valve 50 which is operable by means of a lever 49 pivotally associated with a valve actuating rod 48, and extending throughout the length of the edger. The piston 42 is connected to a vertical connecting rod 44 by means of a pivot 57, and the lower portion of the rod 44 is provided with transverse teeth 46 having openings therebetween. The teeth 46 are cooperable with the teeth 47 of gear segments 45 which are rigidly attached to the pivots 15 of the press rolls 8, 9. The arrangement is such that when the piston 43 is moved downwardly, the press rolls 8, 9 are lifted, and the openings between the teeth 46 of the rod, will positively prevent filling of the gaps between these teeth by sawdust. The pivot 57 permits the rod 44 to swing freely and to thereby avoid undesirable lateral displacement of the piston 43 due to excessive pressure applied to the press rolls, or inaccuracies in the formation of the teeth 46, 47.

The fluid pressure actuated mechanism for raising the press rolls 8, 9, is located at one end thereof, and a cushioning device for preventing free falling of the rolls when the pressure above the piston 43 is released, is provided at the medial portions of the press rolls. This cushioning device comprises a cylinder 13 pivotally associated at its medial portion with a bracket 17 which is rigidly secured to one of the press roll carrier arms 10. Located within the cylinder 13 is a piston 20 secured to a piston rod 12, the outer end of which is secured to a pivot block 18. The piston 20 is provided with one or more relatively small through openings 23 for permitting the gradual passage of fluid confined within the cylinder 13, from one side of the piston 20 to the other. Stuffing boxes 22 cooperate with the rod 12 to prevent escape of fluid from within the cylinder 13. The block 18 is pivotally associated with a bracket 17 rigidly attached to the press roll carrier arm 11. The mechanism obviously functions to check the fall of the press rolls 8, 9 and to bring these rolls into gradual engagement with the material advancing over the feed rolls. The press rolls 8, 9 are rotatable about shaft 16 supported in bearings in the carrier arms 10, 11, and vertical guide rollers 58 serve to prevent entering material from striking the frame.

Figure 1:
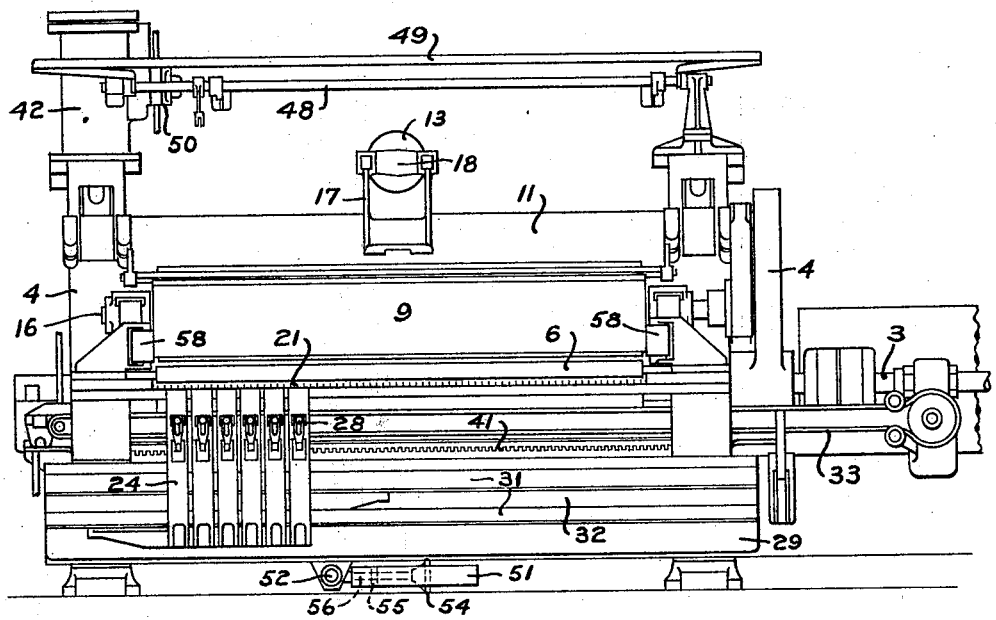
Fig. 1 is a front elevation of an improved saw mill edger especially adapted for heavy work.

Located beneath the medial portion of the edger, is a transverse shaft 52 which pivotally supports a bridge 51. With the edger in operation, the bridge lies flat against the floor as shown in Fig. 1, but the bridge may be raised as shown in dot and dash in Fig. 2, in order to provide a temporary support for the arbor 3 while the saws 2 are being removed from an end thereof. The bridge manipulating mechanism comprises a lever rod 56 having a threaded end with which an adjustable hand wheel 54 coacts. The hand wheel 54 is connected with a collar 55 which may be brought into engagement with a bracket 53 in order to raise the bridge 51 into contact with the arbor 3 after having been righted.

During normal operation of the edger the saws 2 are set in the proper position relatively to the arbor 3, this preferably being accomplished while the saws and the arbor are rotating. The material to be sawed is then advanced between the front feed rolls 6 and the corresponding press roll 9, whereupon it is fed rearwardly past the saws 2 and between the rear feed rolls 5 and the press roll 8, being delivered from the latter in sawed condition.

If it is desired to adjust one or more of the saws 2 longitudinally of the arbor 3, it is only necessary for the operator to grasp the lever 28 and the handle 34 and to initially release the lock by retracting the locking rod 39. Depending upon the direction in which the released saw is to be shifted, the operator subsequently either raises or lowers the lever 28, thereby causing the chain 33 to automatically shift the saw 2 in the desired direction until the shifting motion is stopped by return of the lever 28 to neutral position. The adjusted saw may then be locked in the new position by release of the lever 34, in an obvious manner. It will be apparent that the guide rollers 19, 25, 27 permit rapid shifting of the saws either by power or manually with minimum waste of effort, and the gage 21 provides simple means for determining the cut. The shoes 14 and rollers 19 carried by the brackets 24 closely adjacent to the saws, obviously prevent possible displacement of the shifter mechanism so as to produce buckling of the saws, and such buckling is also avoided by locating the locking mechanism or strip 41 closely adjacent to the saws. The three point support afforded by the rollers 19, 25, 27 eliminates all danger of movement of the shifters, and insures absolute rigidity thereof.

If a larger piece of material is to be passed through the edger, the press rolls 8, 9 may be simultaneously and quickly raised by manipulating the lever 49. Such manipulation of the lever 49 actuates the valve 50 thereby admitting fluid under pressure to the cylinder 42 and quickly raising the press rolls. When the piece has entered the gap between the front press roll 9 and the feed rolls 6, the fluid under pressure may be released from the cylinder 42 thereby permitting the press rolls to lower into engagement with the material. The lowering motion is however checked by means of the cushioning mechanism associated with the medial portions of the carrier arms 10, 11, thereby avoiding violent impact between the relatively heavy press rolls and the material. The pivotal connection between the piston 43 and the rod 44 avoids possible buckling of the piston and the openings between the teeth 46 also assist in eliminating buckling tendencies.

The bridge 51 provides simple and effective means for enabling rapid and safe insertion and removal of saws 2 without disturbing the arbor 3, and the rollers 58 insure proper delivery of the material to the machine.

It should be understood that it is not desired to limit the invention to the exact details of construction and operation herein shown and described for various modifications within the scope of the claims may occur to persons skilled in the art.

It is claimed and desired to secure by Letters Patent:

1. In combination, a saw, means for transporting material relatively to said saw, means for holding said material against said transporting means, means for adjusting said holding means relatively to said transporting means, and means providing a fluid cushion acting independently of said means for resiliently retarding the movement of said holding means.

2. In combination, a saw, a feed roll for transporting material relatively to said saw, a press roll for urging said material against said feed roll, means for adjusting said press roll relatively to said feed roll, and means providing a fluid cushion acting independently of said adjusting means for cushioning said press roll during adjustment.

3. In combination, a saw, a feed roll for transporting material relatively to said saw, a press roll for urging said material against said feed roll, means coacting with an end of said press roll for adjusting the same relatively to said feed roll, and fluid pressure actuated means coacting with a portion of said press roll remote from said end and acting independently of said adjusting means for cushioning said press roll during adjustment thereof.

4. In combination, a saw, a feed roll rotatable about a fixed horizontal axis for transporting material relatively to said saw, a press roll pivotally supported above said feed roll for urging said material against said feed roll, fluid pressure actuated means for moving said press roll about its supporting pivot, and resilient fluid pressure actuated means acting independently of said adjusting means for cushioning said press roll during adjustment thereof.

5. In combination, a plurality of saws, a feed roll for transporting material relatively to said saws, a relatively long press roll for urging said material against said feed roll, fluid pressure actuated means cooperating with an end of said press roll for adjusting the same relatively to said feed roll, and fluid pressure actuated means cooperating with a medial portion of said press roll and acting independently of said adjusting means, for cushioning said press roll during its outward travel.

6. In combination, a saw, feed rolls located on opposite sides of said saw for transporting material toward and away from said saw, a pair of press rolls for urging said material against said feed rolls, means for adjusting said press rolls relatively to said feed rolls, and fluid pressure actuated cushioning means common to said press rolls and acting independently of said adjusting means for checking the movement thereof toward said feed rolls.

7. In combination, a saw, feed rolls for transporting material toward and away from said saw, a press roll movable by fluid under pressure away from each of said feed rolls, and fluid pressure actuated cushioning means acting independently of said press roll moving means to check the movement of each of said press rolls toward the adjacent feed roll.

8. In combination, a plurality of saws, rotatable about a common axis, feed rolls located on opposite sides of the axis of rotation of said saws for transporting material toward and away from the same, a press roll pivotally supported above each of said feed rolls for urging material thereagainst, common fluid pressure actuated means for moving all of said press rolls away from the adjacent feed rolls, and common fluid pressure actuated means acting independently of said moving means for cushioning said press rolls during movement thereof toward said feed rolls.

In testimony whereof, the signatures of the inventors are affixed hereto.

WILLIAM G. HAGMAIER.
ERNEST C. SHAW.